Patented June 15, 1948

2,443,318

UNITED STATES PATENT OFFICE 2,443,318

PORCELAIN TYPE DENTURE COMPOSITION AND METHOD OF PREPARING THE SAME

Pyungtoo William Lee and Charles Dietz, York, Pa., assignors to The Dentists' Supply Company of New York, New York, N. Y., a corporation of New York No Drawing. Application August 18, 1944, Serial No. 550,126

29 Claims. (Cl. 106—35)

This invention relates to the art of ceramic type compositions. More particularly it pertains to materials adapted for the art of dental prosthetics, and, in its preferred aspects, it is concerned with dental type porcelains and the production of artificial teeth therefrom. The invention includes among its features novelty of composition, article and procedure.

The importance of procelains in dentistry is most aptly emphasized by the influence of this type of material upon the art, and in effect the substantial dependency of the art upon them. The many attributes of dental porcelains and their comparatively invaluable characteristics are forcefully illustrated by the field of usage accorded them in detal prosthesis.

Fundamentally, porcelains adapted for the dental art have been predicated upon the inclusion of feldspar, either of natural or synthetic origin, as a principal constituent. In addition, the porcelain usually contains one or more of the well recognized types of perfecting ingredients in varying proportions, exemplified by silica, clay, flint, fluxes, frits, coloring materials, which may be metallic oxides or pigment compounds and the like. Other mineral substances and/or inorganic type compounds may similarly be included to determine predetermined characteristics of the ultimate product.

While these feldspathic porcelains have afforded a more or less expedient element of requisite physical, chemical and aesthetic properties, the dictates of the art have persistently motivated efforts to improve upon the characteristics of the available types of porcelain compositions. In this connection, refining of the respective ingredients of the porcelain composition has been resorted to and new sources or types of materials have been utilized. In this latter category, various types of feldspar, involving differences of chemical analysis and origin, have been tried, with some elements of advantage attributed to them. Nevertheless, dental porcelains have remained essentially feldspathic in composition, and various shortcomings have persisted.

Thus feldspathic porcelain teeth have manifested a distinct lack of resistance to thermal shock. This is indicated by the not infrequent checking or cracking attributed to the frictional heat generated as a result of grinding or drilling artificial teeth, followed by the cooling of the teeth under atmospheric conditions or otherwise. Where the grinding or drilling has been promptly followed by immersion in comparatively cool water to remove adhering ground particles of porcelain, a substantially increased frequency of this objectionable checking or cracking has been noted.

In further illustration of thermal shock difficulties encountered, dental plates which are thermoplastic, or otherwise sensitive to heat, may require adjustment or treatment under substantial temperature conditions, and for this purpose, oil baths at predetermined temperatures may be utilized. Where porcelain facings, teeth, or the like, are in situ on the plate, the temperature differential involved as the result of subjecting the denture to comparatively cool air conditions, or even to immersion in tap water, at prevailing temperatures of the latter, has resulted in a distinct checking or cracking hazard and attendant losses.

An inherent difficulty manifested by artificial porcelain teeth has been in connection with their vesicular structure. The tendency to an excess of blebs, or air bubbles, has prevailed with dental porcelain compositions available, resulting in an increase of void spaces and a decrease of the requisite density in the finished tooth, the net effect being a diminution of the ultimate strength of the tooth. Moreover. any grinding of such artificial teeth may open such blebs thereby exposing comparatively minute pockets which tend to become filled with extraneous materials and thus mar the aesthetic appearance of the tooth.

Other properties of feldspathic porcelain dentures, in addition to their density, which it has been sought to improve are opalescence, translucency, excessive surface luster, vitality involving a closer simulation of natural teeth, et cetera.

It is an object of this invention to substantially obviate the difficulties and uncertainties hereinabove described.

Another object is to provide a ceramic type composition adapted to effectively resist thermal shock in articles derived therefrom.

An additional object is the production of porcelain type compositions adapted to provide physically and aesthetically improved dentures which are resistant to thermal shock between a substantial range of temperatures.

A further object is the obtention of dentures, and especially artificial teeth or the like, of low feldspathic content manifesting improvement in characteristics over that attainable from prior art procelain dentures, which are predicated on a high feldspathic content.

An important object of the invention is to attain artificial teeth and similar dental parts derived substantially from silica or highly siliceous material and manifesting enhanced physical properties including effective resistance to checking or cracking within substantial temperature limits.

A significant object is the provision of dentures of low feldspathic content, and particularly artificial teeth, having increased density, improved surface luster devoid of excessive sheen, and substantially free from the tendency to check or crack within a practicable temperature range.

An added object is a denture substantially of vitreous silica derivation.

Another object is to devise a method for making ceramic compositions, especially adapted for dental prosthesis, and for producing dentures, particularly artificial teeth, manifesting a significant improvement of characteristics and attributes over that obtainable from prevailing feldspathic type dental porcelains.

Other objects, advantages and features of the invention will become apparent from the following disclosure, which is intended to be illustrative and not limitative in scope.

It has been ascertained within the purview of the invention that silica may comprise the significant ingredient of a dental porcelain type composition which manifests a remarkable resistance to thermal shock within the limits of a considerable temperature gradient, as well as other characteristics determinative of an effective improvement in the art of dental prosthesis. To attain the requisite attributes, the silica should be adapted to assume the vitrified or vitreous state in the ultimate articles, and preferably it should be in the form of a highly siliceous vitrifiable or vitreous substance as an essential ingredient of the material or composition, prior to the molding and firing resorted to in the fabrication of the article, such as a denture. Illustrative of the siliceous material contemplated are vitrifiable or vitrified silica, fusable or fused quartz, a high silica glass, and the like, as well as mixtures of such materials.

For preferred results within the realm of the disclosure, an analysis of the siliceous material may comprise approximately 90% of $SiO_2$, with the remainder essentially comprising oxides of the type represented in glass compositions, such as boron oxide and metal oxides embracing the alkali metals and the alkaline earth metals; however, these values may be subject to variation without departing from the scope of the invention. Both from the standpoint of purity and requisite physical state, the siliceous material may desirably comprise a high silica glass containing at least 90% silica, exemplified by a 93% $SiO_2$ glass with an alkali metal oxide content not exceeding approximately 1% and the difference of about 6% constituting boric oxide. Optimum vitreous silica of the type which has been found to be particularly expedient for artificial teeth production should contain between approximately 94.5% and 96% of $SiO_2$, about 0.5% alkali metal oxides with the remainder being made up primarily of $B_2O_3$ to the extent of approximately 3.5% to 5%. However, the siliceous material utilized, whether glass or otherwise, may have a higher content of $SiO_2$ and may be substantially pure vitrifiable or vitreous silica.

It will be understood that the invention is not restricted to any particular source or method for production of the vitreous silica. Thus, silica of the type and condition adapted for glass manufacture may be freed from excessive impurities, such as referred to hereinabove, in any expedient manner. When the content of silica falls within the range indicated above, it is adapted for utilization within the purport of the invention, the essential requisite being that it is vitrifiable.

While the vitrifiable silica as such may be embodied in a dental porcelain, it is preferably subjected to a preliminary vitrification, as by appropriate heat treatment, before being used in or as a composition adapted for dental prosthesis.

Indicative of an expedient procedure for obtaining the desirable type of silica is that disclosed by the patents to Hood et al. No. 2,215,039 and No. 2,286,275. In accordance with these disclosures a borosilicate glass having a substantial content of alkali metal oxides and boron oxides is subjected to heating adapted to separate the glass composition into two phases, one being acid soluble and the other a highly siliceous insoluble phase. The heat treated glass is then leached with a mineral acid for the purpose of substantially removing the soluble content. The insoluble siliceous material is then revitrified by heating to a temperature of approximately 900° C. or above, thereby producing a transparent, homogeneous composition, analyzing approximately 94.5% $SiO_2$, 5% $B_2O_3$, and 0.5% alkali metal oxide. The resultant glass product, when suitably ground, has proven quite satisfactory as a vitreous silica for denture type porcelain compositions pursuant to the present invention. Vitreous silica glass commercially available under the trade name of "Vycor," comprising approximately 96% $SiO_2$ with the remainder chiefly boric oxide, essentially corresponding with the silica glass product described hereinabove, has been found to provide distinctly optimum results within the purview of the invention.

In its adaptation to the art of dental prosthesis, vitreous or vitrified silica, such as that previously described may be utilized within a wide field of compositions and in varying proportions to attain advantageous results. While under certain conditions, vitreous silica of a preferred type, such as a high silica glass, may contribute some advantages to a feldspathic dental porcelain, the invention in its desirable embodiments of novel compositions and dentures is predicated on a low feldspathic content, which from a practicable and comparative standpoint may be referred to as substantially essentially non-feldspathic in character. This does not preclude the presence of feldspar in the preferred embodiments, but the content thereof is in distinctly minor proportion, and preferably comprises an essential ingredient of the flux composition which has been found to contribute substantially to the characteristics of the dental porcelain of the invention and dentures attainable therefrom.

Porcelain type compositions found to produce a distinctly improved and novel denture embrace vitrifiable or vitreous silica, together with a substance, or substances, which will be referred to herein as a ceramic flux, although it is to be understood that this so-called flux may contribute desirable properties, particularly in combination with the vitreous silica, to the denture. The silica and flux may be utilized in proportions up to approximately 50% of each, this ratio being subject to variation, dependent upon the extent of the perfecting ingredients included in the composition. The content of perfecting ingredients will similarly be dependent upon the usual practice within the skill of the art.

The preferable porcelain type compositions, especially for dental prosthesis, contemplate a major proportion of vitreous silica relative to the flux content. By major proportion it is intended to connote a content of vitreous silica in excess of 50% of the composition as a whole. The more effective compositions have been found to require a minimum vitreous silica content of approximately 75%, with the general range embracing approximately 75% to approximately 95%, the flux substantially constituting the remainder and comprising approximately 25% to approximately 5%.

While a flux compound or composition of substantially any type known to the art, illustrated by borax, $Na_2B_4O_7.10H_2O$, may be effectively utilized conjointly with the vitreous silica compositions, fluxes that have proved especially expedient for the silica type porcelain and adapted to enhance the desirable characteristics of dentures, have been determined as feldspathic in character. Illustrative of a desirable embodiment of this type of flux is the composition comprising feldspar, an alkaline earth metal silicate, clay, natural or synthetic, and a boron oxide. As usually formulated in accordance with the present invention, the feldspar is utilized in major proportion, with the silicate, clay and boron oxide present in successively reduced proportions, in the order stated.

However, it should be noted that the composition of the flux utilized may be subject to variation dependent upon the actual characteristics of the dental porcelain, the silica content thereof, and the particular properties contemplated for the flux and the article to be produced. For example, the boric oxide content tends to lower the melting point of the flux, while the clay and silicate are adapted to elevate the flux melting point. In addition, the clay affords an element of toughness to the over-all composition containing the vitreous silica, and the feldspar serves to convey properties which modify the vitreous silica in desirable measure, particularly with respect to appropriately simulating porcelain, and providing a sufficient luster, et cetera.

A flux composition containing commercial magnesium silicate, kaolin ($Al_2O_3.2SiO_2$) and $B_2O_3$, as well as feldspar, has contributed to the obtention of artifical teeth and dentures generally manifesting a very substantial improvement over that heretofore attainable in the art.

Following is an example of the optimum composition of flux which has been especially compatible with vitreous silica, desirably of a preferred type such as ground high silica glass or "Vycor," and which admixed with the vitreous silica in preferred proportions has provided dentures, and especially artificial teeth, distinctly superior in certain respects to feldspathic porcelain teeth:

Per cent
A. Fritted ground feldspar_____ 50
B. A ground product of fusion resulting from the following mixture of ingredients: (1) 50% commercial magnesium silicate, anhydrous, (2) 39% kaolin, (3) 11% $B_2O_3$_____ 50

The melting temperature of this flux composition is approximately 2100° F. when prepared pursuant to the method described hereunder.

Further illustrative of the preferred embodiment of flux, an expedient method of preparing the same is described, it being understood that the method in its general application pertains to the production of other fluxes of the same type within the broad contemplation of the flux disclosure herein.

Commercial magnesium silicate, boric oxide, and kaolin, or synthetic clay, corresponding with the formula $Al_2O_3.2SiO_2$, are mixed in the predetermined proportions. The mixture is fused together and desirably stirred to attain uniformity. After the product of fusion has solidified, it may be ground to a powder having a particle size adapted to pass through the 170 mesh sieve of the U. S. standard sieve series or the Tyler standard screen scale.

Similarly, feldspar adapted for porcelain denture production is fritted and ground to a mesh size corresponding with that of the ground product of fusion as indicated above.

The fritted ground feldspar and the ground product of fusion obtained from the magnesium silicate, kaolin and boron oxide are then mixed together, desirably in equal proportions. This final mixture is then subjected to heating sufficient to fuse the same, and in any expedient manner, as by agitation, the fused mass is rendered homogeneous or uniform. After the molten mass has solidified, it is ground to a predetermined particle size, desirably to pass a 170 mesh sieve as above specified. This final ground mixture comprises the optimum embodiment of flux which is preferably added to the substantially pure vitreous silica or "Vycor" glass for preparing a dental porcelain composition of predetermined type.

While the method has been set forth in terms of the preferred details of procedure, it is subject to variation within the skill of one versed in the art, and is not intended to be limiting in its scope or application. As previously indicated, the composition or ingredients of the optimum embodiment of flux may similarly be subject to variation. Thus, the magnesium silicate may be replaced by calcium or strontium silicate and a quite desirable flux attained. Similarly, the hydrated silicates may be utilized in lieu of anhydrous compounds since the melting temperature of the flux will serve to remove any water of crystallization or moisture which can be eliminated. The optimum range of porcelain type composition, which is particularly adapted for the production of dentures, comprises at least 85% vitreous $SiO_2$, with the remainder substantially comprising the preferred feldspathic flux. Preferably the vitreous $SiO_2$ is in the approximate concentration range of 87.5% to 90%, with the feldspathic flux essentially determining the remainder and desirably comprising approximately 12.5% to 10%. The preferred optimum embodiment of the composition is represented by a content of approximately 90% of vitreous $SiO_2$, desirably ground "Vycor" glass, admixed with approximately 10% of the above described preferred feldspathic flux composition. Without intending to be restricted by any particular theory or explanation, the preferred optimum embodiment of porcelain type composition appears to manifest characteristics suggestive of a eutectic mixture in that it provides the lowest expedient firing temperature, for example in the firing of dentures such as teeth, and results in a substantially improved product having the enhanced properties disclosed herein. As the composition varies from the said preferred embodiment, there is a deviation from the desirable attributes which apply for the optimum composition, although the eutectic mixture characteristics may be generally applicable within the optimum range disclosed, and become substantially reduced outside the optimum range.

Any expedient procedure, conventional or otherwise, may be resorted to for the manufacture of dentures from compositions within the purview of the invention. Thus the preferred composition comprising a low feldspathic porcelain as above described, may be mixed with a predetermined content of pigment, desirably a metallic oxide, and/or other perfecting ingredients, as well as with a binding material, preferably organic in character, exemplified by starch. The content, type and manner of incorporating the perfecting ingredients will be in accordance with the recognized practice in the art, the significance of the present invention being generally maintained by the relative proportions and characteristics of the silica and flux disclosed herein. After molding the composition to the predetermined form, it is subjected to the usual firing treatment.

It is significant, however, that an appropriate temperature be resorted to in the furnacing of the ceramic composition, this being determined to the extent that the silica content will not be devitrified. Where the plastic composition to be fired contains the vitrifiable silica in lieu of the preferred vitrified silica, the firing treatment will be at a temperature which will serve both to vitrify the silica and to provide the requisite furnacing treatment without devitrification.

An optimum temperature for firing the preferred embodiment of dental porcelain type composition containing 90% of the preferred type of vitreous silica, such as ground "Vycor" glass or a ground glass comprising approximately 96% $SiO_2$ with the remainder thereof chiefly boric oxide, and about 10% of preferred embodiment of feldspathic flux, has been found to be approximately 2550° F. This temperature may within limits be construed as of critical importance, since any substantial deviation may result in objectionable devitrification, with the result that an effective firing and enhanced product are not attainable. It will be noted that the preferred type of vitreous silica is exemplified by ground "Vycor" glass or a ground high silica glass of the type above described containing approximately 94.5% $SiO_2$ together with about 0.5% alkali metal oxide and about 5% $B_2O_3$.

Where the composition contains more than 10% of flux, the tendency is for the optimum firing temperature to decrease within limits, depending upon the characteristics of the composition and the extent to which the flux content exceeds 10%. For example, where the vitreous silica comprises approximately 87.5% with the remainder being essentially the preferred embodiment of feldspathic flux, an expedient firing temperature is in the vicinity of 2500° F. With the proportion of the flux substantially exceeding 15%, there may be some tendency manifested toward aggregation of the particles and/or slumping, that is the tendency of the molding composition to lose form or surface detail during the firing treatment. On the other hand, where the flux content is substantially less than 10%, the firing temperature may be substantially increased.

The following results of an illustrative test is indicative of the resistance to thermal shock of feldspathic teeth of the type available in the prior art, and of artificial teeth made from the low feldspathic optimum porcelain type composition comprising 90% of the preferred type vitreous silica, ground "Vycor" glass, and 10% of the preferred embodiment of feldspathic flux. Six of the low feldspathic type and six of the conventional feldspathic type were involved in the test:

| Maximum Temperature | Minimum Temperature | Number of Teeth Checking | |
|---|---|---|---|
| | | Low-feldspathic | High-feldspathic |
| °C. | °C. | | |
| 100 | 12 | 0 | 0 |
| 120 | 12 | 0 | 1 |
| 150 | 12 | 0 | 5 |
| 260 | 12 | 0 | |
| 370 | 12 | 0 | |
| 429 | 12 | 1 | |
| 481 | 12 | 5 | |

In the foregoing tests, the temperature of 12° C. was chosen merely as an element of expediency, since it represented the temperature of tap water available. The results indicate that the high feldspathic porcelain teeth all check or crack when quenched in water of approximately 12° C. Thus the temperature differential in the case of these feldspathic teeth was approximately 108° C.

The low feldspathic teeth, representative of the preferred embodiment of the invention, showed no signs of checking until the temperature differential was that between 429° C. and 12° C., namely 417° C. This gradient resulted in the cracking of but one tooth, whereas the remaining five checked in the temperature drop between 481° C. and 12° C. which represents a differential of 469° C. As between 370° C. and 12° C., involving a drop of 358° C. no signs of checking were apparent, and for all intents and purposes, it is quite probable that the temperature differential which is normally encountered in the dental art will not exceed this gradient.

Accordingly, it will be apparent that the invention contemplates a substantial improvement in the art of dental prosthesis whereby dentures may be fabricated which manifest a surprising resistance to thermal shock, an increased density and attendant diminution of blebs, a wide firing range and high viscosity indicated by a decrease in slump tendency and by satisfactory form retention during firing, and improvements in opalescence, as well as in similarity to natural teeth, both from the standpoint of vitality and luster. In addition, desirable attributes of strength, resistance to abrasion, color stability, translucency, high resistance to chemical reagents of the type encountered in the oral cavity, and other qualities requisite of an artificial tooth or denture are manifested. It will be understood that the materials utilized pursuant to the present invention in its adaptation to dental prosthesis should comply with the refinement requisite of materials utilized in the denture art, such as purity, freedom from excessive extraneous particles and the like.

While the invention has been described in accordance with desirable embodiments and details of procedure, it is obvious that many changes and modifications may be made in the details thereof and in the characteristics of the compositions and articles obtained therefrom without departing from the spirit of the invention as defined in the following claims.

Having thus set forth our invention, we claim:

1. A ceramic composition adapted for dental prosthesis comprising at least 75% vitreous silica comparatively free from other substances, and, the remainder comprising essentially a flux:

2. A ceramic composition comprising at least 75% ground high silica glass comparatively free from other substances and, the remainder comprising essentially a feldspathic flux.

3. A ceramic composition comprising at least 75% of vitreous silica containing between approximately 93% to approximately 96% $SiO_2$ and, the remainder comprising essentially a feldspathic flux.

4. A porcelain type denture composition comprising at least 75% of vitreous silica comparatively free from other substances and a flux derived from feldspar, an alkaline earth metal silicate, kaolin and a boron oxide.

5. A low feldspathic dental porcelain composition comprising a major portion of substantially pure vitreous silica and a minor portion of a fritted flux composition derived from fritted ground feldspar and a ground product of fusion initially including magnesium silicate, boric oxide, and kaolin.

6. A low feldpathic porcelain type composition comprising vitreous silica in the approximate proportion of 75-95% and a feldspathic flux comprising between approximately 25 and 5%.

7. A composition adapted for dental prosthesis comprising approximately 90% of a vitreous silica and approximately 10% of a flux derived from fritted feldspar and a ground product of fusion initially including magnesium silicate, boric oxide, and kaolin.

8. A composition as in claim 7, wherein the materials included in the flux comprise 50% of ground fritted feldspar and 50% of the ground product of fusion initially containing 50% commercial magnesium silicate, 39% of kaolin and 11% of $B_2O_3$, said fritted feldspar and ground product of fusion being fused together and ground to pass a 170 mesh Tyler sieve.

9. A denture comprising a fired mixture containing a major proportion of a ground high silica glass and a minor proportion of a fritted flux initially containing a feldspar, kaolin, boric oxide, and magnesium silicate.

10. A denture comprising a fired mixture containing approximately between 87½% and 90% of a vitreous silica and a flux in the approximate proportion of 10 to 12½%, said flux initially containing ground fritted feldspar and the ground product of fusion of magnesium silicate, kaolin, and a boron oxide, said fritted feldspar and ground product of fusion being fused together and reground.

11. An artificial tooth comprising a fired mixture containing substantially 90% of a ground high silica glass, containing approximately 93% to 96% silica, and substantially 10% of a flux derived from equal portions of ground fritted feldspar and a product of fusion initially containing magnesium silicate, kaolin, and $B_2O_3$, said fritted feldspar and product of fusion being fused together and reground.

12. The artificial tooth as in claim 11, wherein the product of fusion initially comprises approximately 50% of commercial anhydrous magnesium silicate, 39% of kaolin and 11% of $B_2O_3$.

13. The artificial tooth as in claim 11, wherein the ground high silica glass comprises approximately 96% $SiO_2$ with the remainder principally boric oxide, and the product of fusion initially comprises approximately 50% of commercial anhydrous magnesium silicate, 39% of kaolin and 11% of $B_2O_3$.

14. A flux composition comprising the fusion product obtained from a mixture of ground fritted feldspar and a ground product of fusion initially containing an alkaline earth silicate, a boron oxide and kaolin.

15. A flux composition comprising the fusion product obtained from a mixture of approximately 50% of ground fritted feldspar and approximately 50% of a ground product of fusion initially containing about 50% of commercial anhydrous magnesium silicate, approximately 39% of kaolin and approximately 11% of $B_2O_3$, the fritted feldspar and ground product of fusion having been melted together, solidified and reground.

16. The method of preparing a porcelain type denture composition which comprises fusing a mixture containing approximately 50% commercial anhydrous magnesium silicate, 39% of kaolin and 11% of $B_2O_3$, solidifying and grinding this mixture to obtain a ground product of fusion, mixing this ground product of fusion with fritted feldspar in substantially equal proportions, fusing the resultant mixture, solidifying and grinding the same to provide a flux composition, and mixing approximately 10%–12.5% of this flux with 90%–87.5% of a vitreous silica.

17. The method of preparing a flux which comprises fusing a mixture containing an alkaline earth metal silicate, kaolin, and a boron oxide, solidifying and grinding this mixture to obtain a ground product of fusion, mixing this ground product of fusion with fritted feldspar in predetermined proportions, fusing the resultant mixture, solidifying and grinding the same.

18. The method of preparing a low feldspathic denture which comprises mixing at least 85% of a vitreous silica comparatively free from other substances with a feldspathic flux in minor proportion, together with small amounts of binding material and coloring oxides, molding said composition, and firing said molded composition at an optimum temperature adapted to obviate devitrification of the silica.

19. The method of preparing a low feldspathic denture which comprises mixing 87.5% to 90% of vitreous silica with 12.5% to 10% of a flux, said flux being derived from approximately 50% of ground fritted feldspar and approximately 50% of a ground product of fusion initially containing about 50% of commercial anhydrous magnesium silicate, approximately 39% of kaolin and approximateyl 11% of $B_2O_3$, the fritted feldspar and ground product of fusion having been melted together, solidified and reground, adding to the vitreous silica-flux mixture coloring material and an organic binder in small quantities, molding the denture to the predetermined form, and firing the denture at a temperature within the range of approximately 2500° F. to 2550° F., the temperature being adapted to avoid devitrification of the silica.

20. A dental porcelain type composition comprising as a minimum 85% of a ground glass containing at least 93% $SiO_2$, and ground fritted feldspathic flux in a proportion not exceeding 15%, said flux being derived from approximately 50% of ground fritted feldspar and 50% of a ground product of fusion initially containing in approximate proportions 50% magnesium silicate, 39% kaolin, and 11% boric oxide.

21. A denture comprising essentially a fired mixture containing a ground silica glass, said glass being approximately 93% to approximately 96% $SiO_2$ with the remainder chiefly boric oxide, and a minor proportion of a feldspathic flux.

22. A denture comprising essentially a fired mixture containing 90% of a ground glass, said glass being approximately 96% SiO₂ with the remainder principally boric oxide, and 10% of a ground fritted feldspathic flux derived from approximately 50% of ground fritted feldspar and 50% of the ground product of fusion initially containing in approximate proportions 50% anhydrous magnesium silicate, 39% kaolin and 11% boric oxide.

23. The method of preparing a porcelain type denture composition which comprises preparing a fritted flux from ground fritted feldspar and a ground fusion product obtained from an alkaline earth metal silicate, kaolin and boric oxide, mixing with said flux ground 96% silica glass, and molding the mixture to predetermined form and firing the same.

24. The method of preparing a porcelain type denture composition which comprises fusing a mixture containing approximately 50% commercial anhydrous magnesium silicate, 39% of kaolin and 11% of B₂O₃, solidifying and grinding this mixture to obtain a ground product of fusion, mixing this ground product of fusion with fritted feldspar in substantially equal proportions, fusing the resultant mixture, solidifying and grinding the same to provide a flux composition, mixing approximately 10% of this flux with approximately 90% of a ground silica glass containing approximately 96% SiO₂ with the remainder being chiefly boric oxide, molding said composition to a predetermined form, and firing said composition.

25. A denture comprising a fired mixture containing vitreous silica in the approximate range of 87.5% to 90% and a flux.

26. A denture comprising a fired mixture containing approximately 87.5% to 90% of a vitreous silica and a feldspathic flux fusion product.

27. A denture comprising essentially a fired mixture containing ground silica glass in the approximate proportion of 87.5% to 90%, said glass being approximately 93% to approximately 96% SiO₂, and a minor proportion of a flux.

28. A denture comprising essentially a fired mixture containing approximately 90% of a ground silica glass, said glass being approximately 96% SiO₂, and approximately 10% of a fritted feldspathic flux.

29. An artificial tooth comprising essentially a fired mixture containing approximately 90% of a ground silica glass and a feldspathic flux fusion product, said glass being approximately 96% SiO₂ with the remainder chiefly boric oxide.

PYUNGTOO WILLIAM LEE.
CHARLES DIETZ.

REFERENCES CITED

The following references are of record in the file of this patent:

UNITED STATES PATENTS

| Number | Name | Date |
|---|---|---|
| 1,671,104 | Eberly | May 29, 1928 |
| 2,247,331 | Ferguson | June 24, 1941 |
| 2,341,998 | Lee et al. | Feb. 15, 1944 |

FOREIGN PATENTS

| Number | Country | Date |
|---|---|---|
| 2,527 | Great Britain | 1877 |
| 41,648 | France | 1932 |
| 103,400 | Switzerland | 1924 |
| 263,765 | Great Britain | 1927 |
| 296,765 | Great Britain | 1930 |